United States Patent Office 3,316,268
Patented Apr. 25, 1967

3,316,268
PYRIMETHAMINE SALTS WITH BROMINATED NAPHTHOIC ACIDS
Edward F. Elslager and Donald F. Worth, Ann Arbor, Mich., assignors to Parke, Davis & Company, Detroit, Mich., a corporation of Michigan
No Drawing. Original application Apr. 20, 1962, Ser. No. 188,984, now Patent No. 3,161,641, dated Dec. 15, 1964. Divided and this application Apr. 24, 1964, Ser. No. 362,501
The portion of the term of the patent subsequent to Feb. 22, 1983, has been disclaimed
4 Claims. (Cl. 260—256.4)

This application is a division of our copending application Ser. No. 188,984, filed Apr. 20, 1962, now U.S. Patent 3,161,641.

The present invention relates to salts of 2,4-diamino-5-(p-chlorophenyl)-6-ethylpyrimidine with 6,6'-dibromo-2,2'-dihydroxy(1,1'-binaphthalene)-3,3'-dicarboxylic acid, 4,4'-methylenebis(7-bromo-3-hydroxy-2-naphthoic acid), 7-bromo-4,4'-methylenebis(3-hydroxy-2-naphthoic acid), and with 7 - bromo - 3,1' - dihydroxy-4,4'-methylenedi-2-naphthoic acid, and to methods for their production.

The compounds of the invention are produced by reacting 2,4-diamino-5-(p-chlorophenyl)-6-ethylpyrimidine with the appropriate acid mentioned above; or by reacting a soluble salt of 2,4-diamino-5-(p-chlorophenyl)-6-ethylpyrimidine with a soluble salt of the appropriate acid. The term "soluble salt" is used herein in a relative sense and means a degree of solubility substantially greater than that exhibited by the products of the invention. Representative soluble salts of the pyrimidine base suitable for use in the process of the invention include the hydrochloride, hydrobromide, hydriodide, sulfate, phosphate, sulfamate, acetate, lactate, tartrate, gluconate, citrate, and salicylate. Representative soluble salts of the acids described above suitable for use in the process of the invention include the alkali metal, alkaline earth metal, ammonium and amine salts. The invention comprehends the starting materials and final products in their hydrated as well as anhydrous forms. If desired, the starting materials used in the process can be converted in situ to the desired base, acid, or soluble salt form by treatment with an acid or base, as by neutralizing one or more of the carboxyl groups with base, by treatment of a carboxylate salt with a mineral acid, by treatment of an acid-addition salt with a base, or by treatment of the pyrimidine base with an acid. The process of the invention is preferably carried out in a solvent in which the reactants are at least partially soluble and which is relatively unreactive toward each of the reactants. Suitable solvents include water, aqueous alkanols, dimethylacetamide, acetonitrile and mixtures thereof. Other satisfactory reaction media can be chosen from among a wide variety of solvents, particulary those which are neutral and polar. The salt formation proceeds fairly rapidly upon mixing the reactants in the selected solvent. The process can be carried out at room temperature or below, although in many cases a high yield and a crystalline form conducive to rapid filtration are facilitated by heating the reaction mixture for up to about an hour and then chilling it. The reactants are customarily employed in approximately the same ratio in which they appear in the desired final product. If it is desired to obtain the salt of the pyrimidine base with one-half formula weight of the dibasic acid it is customary to employ these reactants or soluble salts thereof in the ratio of 2 moles of the former to 1 mole of the latter. If it is desired to obtain the salt of the pyrimidine base with one formula weight of the dibasic acid best results are obtained by reacting a soluble salt of the pyrimidine base with an equimolar quantity of a soluble salt (such as the disodium salt) of the appropriate acid in the presence of one equivalent of a mineral acid. In those cases where the reaction product precipitates directly it is isolated by filtration or centrifugation. In those instances where it does not precipitate directly it is first made insoluble by concentraton of the reaction mixture or by dilution of the reaction mixture with a solvent in which the product is insoluble, and then collected.

The products of the invention are antimalarial agents exhibiting especially long duration of action. It is known that 2,4 - diamino-5-(p-chlorophenyl)-6-ethylpyrimidine, otherwise known as pyrimethamine, is an antimalarial drug and is highly active against erythrocytic parasites. However, for collective prophylaxis the usual recommended adult dose is 25 mg. administered once a week. For large scale malaria eradication programs it is impractical to administer an antimalarial agent on such a frequent schedule. However, the compounds of the present invention posses the high antimalarial activity of 2,4-diamino-5-(p-chlorophenyl)-6-ethylpyrimidine, are non-irritating upon injection, and exhibit unusually long duration of action, thereby making it possible to extend the dosage interval from one week to as long as several months. The products of the invention can be formulated into suspensions which are pharmaceutically acceptable for intramuscular injection, using suspending vehicles such as 40% benzyl benzoate and 60% castor oil, or water containing emulsifying or dispersing agents.

The invention is illustrated by the following examples.

EXAMPLE 1

A solution of 1.33 g. of 6,6'-dibromo-2,2'-dihydroxy-(1,1'-binaphthalene)-3,3'-dicarboxylic acid in 100 ml. of hot methanol is added to a solution of 1.24 g. of 2,4-diamino-5-(p-chlorophenyl)-6-ethylpyrimidine in 100 ml. of hot methanol. The crystalline salt is collected by filtration, washed with methanol and dried in vacuo at 75° C. This is the desired 2,4-diamino-5-(p-chlorophenyl-6-ethylpyrimidine, salt with ½ formula weight of 6,6'-dibromo - 2,2'-dihydroxy-(1,1'-binaphthalene)-3,3'-dicarboxylic acid, monohydrate; pale yellow crystals, M.P. 305–315° C. (dec.).

6,6' - dibromo-2,2'-dihydroxy-(1,1'-binaphthalene)-3, 3'-dicarboxylic acid, employed as a starting material in the above procedure, is prepared as follows: to a solution of 4.4 g. of sodium hydroxide and 29.4 g. of 7-bromo-3-hydroxy-2-naphthoic acid in 850 ml. of boiling water is added dropwise a solution of 33 g. of ferric chloride hexahydrate in 70 ml. of water. The reaction mixture is stirred and boiled under reflux for 30 minutes, filtered, and the precipitate stirred with 2 1. of 18% hydrochloric acid on the steam bath for 1 hour. The yellow-green solid is collected by filtration, washed thoroughly with water and dried in vacuo at 45° C. Crystallization of the crude acid from an ethanol-water mixture gives the desired 6,6'-dibromo-2,2'-dihydroxy-(1, 1'-binaphthalene)-3,3'-dicarboxylic acid as yellow crystals, M.P. 357° C. (dec.).

EXAMPLE 2

A solution of 1.36 g. of 4,4'-methylenebis(7-bromo-3-hydroxy-2-naphthoic acid) in 25 ml. of dimethylacetamide is poured into a solution of 1.24 g. of 2,4-diamino-5-(p-chlorophenyl)-6-ethylpyrimidine in 200 ml. of hot methanol. Upon cooling, the precipiate is collected by filtration, slurred with warm methanol, and dried at 75° C. in vacuo. This is the desired 2,4-diamino-5-(p-chlorophenyl)-6-ethylpyrimidine, salt with ½ formula weight of 4,4' - methylenebis(7 - bromo-3-hydroxy-2-naphthoic acid), monohydrate; pale yellow crystals, M.P. 260–262° C.

4,4'-methylenebis(7-bromo-3-hydroxy-2-naphthoic acid, employed as an intermediate in the above preparation, is prepared as follows: a mixture of 26.7 g. of 7-bromo-3-hydroxy-2-naphthoic acid, 6.0 g. of sodium hydroxide and 700 ml. of water is heated to 90° C. on the steam bath and 6.0 ml. of 40% formaldehyde solution is added. The resulting light brown solution is stirred and heated on the steam bath for 2 hours and cooled. The precipitate is collected by filtration, dissolved in hot water, filtered, and the filtrate acidified with hydrochloric acid. The precipitate is collected by filtration and dried in vacuo at 65° C. The bright yellow solid thus obtained is the desired 4,4'-methylenebis(7-bromo-3-hydroxy-2-naphthoic acid), M.P. 330–335° C. (dec.).

EXAMPLE 3

A solution of 1.19 g. of 7-bromo-4,4'-methylenebis(3-hydroxy-2-naphthoic acid) in 25 ml. of dimethylacetamide is added to a hot solution of 1.24 g. of 2,4-diamino-5-(p-chlorophenyl)-6-ethylpyrimidine in 150 ml. of methanol. Upon cooling, the precipitate is collected by filtration and crystallized from acetone-water. This is the desired 2,4-diamino-5-(p-chlorophenyl)-6-ethylpyrimidine, salt with ½ formula weight of 7-bromo-4,4'-methylenebis(3-hydroxy-2-naphthoic acid), ¾ hydrate; off-white crystals, M.P. 222–225° C.

The 7-bromo-4,4'-methylenebis(3-hydroxy-2-naphthoic acid) used as a starting material in the above procedure is prepared as follows. A slurry of 20.0 g. of 4-(chloromethyl)-3-hydroxy-2-naphthoic acid, methyl ester in 500 ml. of hot glacial acetic acid is added to a hot solution of 21.3 g. 7-bromo-3-hydroxy-2-naphthoic acid in 250 ml. of glacial acetic acid, and the mixture is stirred and heated on the steam bath for 3.5 hours. Upon cooling, the precipiate is collected by filtration, washed with a small portion of glacial acetic acid, and dried in vacuo at 75° C. This is the intermediate 7-bromo-4,4'-methylenebis(3-hydroxy-2-naphthoic acid), 2'-methyl ester. The intermediate acid-ester is dissolved in 500 ml. of 1 N sodium hydroxide solution and the solution is heated on the steam bath for 2 hours and filtered. The filtrate is poured into an excess of dilute hydrochloric acid, and the precipitate is collected by filtration, washed with water and dried in vacuo at 75° C. Crystallization from dimethylformamide-water gives the desired 7-bromo-4,4'-methylenebis(3-hydroxy-2-naphthoic acid), M.P. 305–307° C.

EXAMPLE 4

Utilizing the procedure described under Example 3 above, 1.19 g. of 7-bromo-3,1'-dihydroxy-4,4'-methylenedi-2-naphthoic acid and 1.24 g. of 2,4-diamino-5-(p-chlorophenyl)-6-ethylpyrimidine are reacted to give the desired 2,4-diamino-5-(p-chlorophenyl)-6-ethylpyrimidine, salt with ½ formula weight of 7-bromo-3,1'-dihydroxy-4,4'-methylenedi-2-naphthoic acid; off-white crystals, M.P. 228–232° C., from acetone-water.

7-bromo-3,1'-dihydroxy-4,4'-methylenedi-2-naphthoic acid, employed as a starting material in the above procedure, is prepared as follows. A mixture of 28.1 g. of 7-bromo-3-hydroxy-2-naphthoic acid, methyl ester, 25 ml. of formalin and 200 ml. of concentrated hydrochloride acid is kept at room temperature for 2 days with occasional shaking. The precipitate is collected by filtration, dried in vacuo at 45° C. and crystallized from ethyl acetate. This product, M.P. 191–200° C., is the intermediate 7-bromo-4-(chloromethyl)-3-hydroxy-2-naphthoic acid, methyl ester, which is subsequently allowed to react with 1-hydroxy-2-naphthoic according to the procedure described under Example 3 above for the preparation of 7-bromo-4,4'-methylenebis(3-hydroxy-2-naphthoic acid).

We claim:
1. A salt of 2,4-diamino-5-(p-chlorophenyl)-6-ethylpyrimidine with one-half formula weight of 6,6'-dibromo-2,2'-dihydroxy-(1,1'-binaphthalene)-3,3'-dicarboxylic acid.
2. A salt of 2,4-diamino-5-(p-chlorophenyl)-6-ethylpyrimidine with one-half formula weight of 4,4'-methylenebis(7-bromo-3-hydroxy-2-naphthoic acid).
3. A salt of 2,4-diamino-5-(p-chlorophenyl)-6-ethylpyrimidine with one-half formula weight of 7-bromo-4,4'-methylenebis(3-hydroxy-2-naphthoic acid).
4. A salt of 2,4-diamino-5-(p-chlorophenyl)-6-ethylpyrimidine with one-half formula weight of 7-bromo-3,1'-dihydroxy-4,4'-methylenedi-2-naphthoic acid.

References Cited by the Examiner
UNITED STATES PATENTS
2,576,939  12/1951  Hitchings et al. ____ 260—256.4

ALEX MAZEL, *Primary Examiner.*

HENRY R. JILES, *Examiner.*

MARY U. O'BRIEN, *Assistant Examiner.*